July 29, 1952    J. M. TYLER    2,605,062
AIRCRAFT ENGINE MOUNT
Filed Oct. 2, 1947
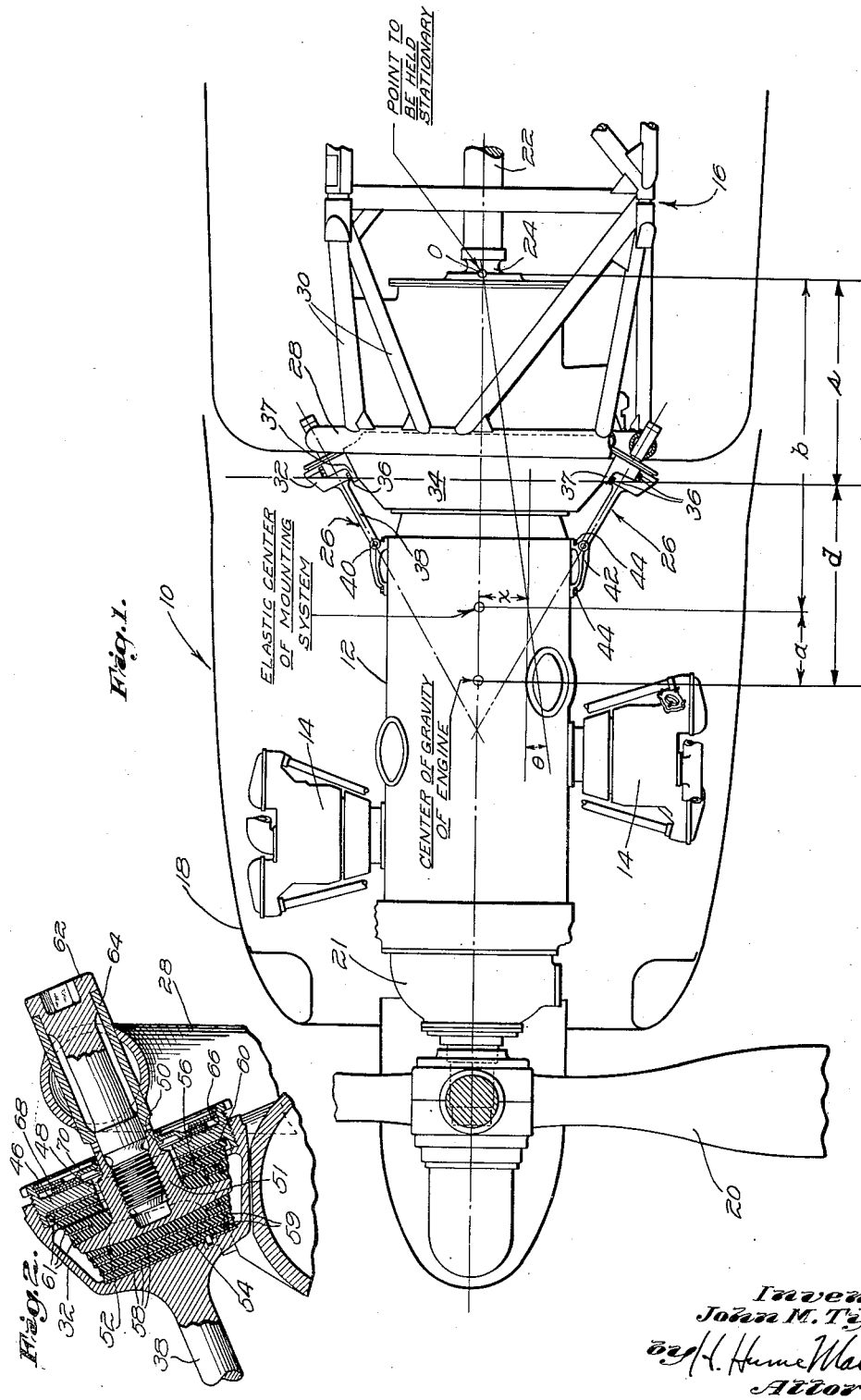
Inventor
John M. Tyler
by H. Hume Mathews
Attorney Patented July 29, 1952

2,605,062

UNITED STATES PATENT OFFICE 2,605,062

AIRCRAFT ENGINE MOUNT

John M. Tyler, West Hartford, Conn., assignor to United Aircraft Corporation, East Hartford, Conn., a corporation of Delaware Application October 2, 1947, Serial No. 777,525

2 Claims. (Cl. 244—54)

This invention relates to improvements in engine mounting systems, and particularly to a resilient mounting system for a radial aircraft engine having a power take-off shaft connected to the engine through a universal joint.

An object of the invention is to provide a system of resilient suspension or mount units for an aircraft power plant in which the principal axes of the units are so arranged and the stiffness ratios of these units are so chosen that a selected point within, or on, the power plant remains stationary with respect to the airplane structure irrespective of $g$ loads or maneuver acceleration loads. Thus, the compressive axes of the mount units are so located and the stiffness ratios of the units are so chosen that the distance from the elastic center of the mounting system to the center of gravity of the power plant and the distance from the elastic center to a selected point, which it is desired to maintain stationary, are so related with respect to each other and with respect to the translational stiffness and rotational stiffness of the mounting system at and around the elastic center of the system that the selected point is maintained stationary during lateral deflections of the power plant. The elastic center of the system is the point at which the application of a force will cause pure translation of the power plant and which lies on the axis about which the power plant will rotate when a couple is applied thereto.

The invention is particularly intended to provide a resilient mounting means for an aircraft power plant capable of maintaining the alignment of a power take-off at the rear of the power plant with respect to a driven member carried by fixed airplane structure; the power plant is flexibly mounted for movement as a whole relative to the aircraft structure but the center of a universal joint connecting the power take-off and the power plant remains substantially stationary.

More specifically, it is an object of the invention to provide a resilient mounting system for a power plant having a power take-off shaft connected thereto by a universal joint, in which the elastic center of the mounting system, or the point of virtual support, is located at a predetermined point on a line passing through the center of gravity of the power plant and the center of the universal joint, said predetermined point being spaced from said centers by respective distances whose product is equal to the ratio between the rotational and translational stiffnesses of the mount system around and at the elastic center.

These and other objects and advantages of the invention will be pointed out or will become apparent from the following detailed description of one embodiment of the invention shown for purposes of illustration in the accompanying drawing.

In the drawing,

Fig. 1 shows a side elevation, partly in section, of an aircraft power plant and a resilient mounting system therefor, the mounting system being shown somewhat diagrammatically and some of the engine cylinders being removed to facilitate illustration;

Fig. 2 is a longitudinal section through a part of one of the mount units on an enlarged scale.

In the embodiment of the invention shown in the drawing, an internal combustion engine power plant 10 incorporating an engine of the multirow, radial type has a crankcase 12 supporting a plurality of cylinders 14 radially arranged about the engine crankshaft and enclosed within the engine cowling 18. The crankshaft drives propeller 20 through reduction gearing in the nose section 21 and drives a power take-off shaft 22 through an accessory shaft in the engine rear section 34. The take-off or extension shaft 22 is connected at one end to the engine accessory drive shaft by a universal joint 24 having its center of universal movement at 0. At its other or aft end shaft 22 is connected to the driveshaft of a stationary device or accessory such as an electrical generator (not shown) which is fixed to the aircraft structure.

Engine 10 is resiliently supported on the fixed structure of the airplane by a plurality of pedestal type engine mount units generally indicated at 26 which are of the type disclosed and claimed in the Tyler and Willgoos application, Serial No. 579,542, filed February 24, 1945, which is now Patent No. 2,477,501, issued July 26, 1949. A plurality of these engine mount units, for example seven, are disposed at equally spaced points about the engine and about a mounting ring 28 which is connected to fixed airplane structure by rigid frame members 30. To facilitate illustration of the invention, only two of these units are shown in Fig. 1.

Each engine mount unit 26 includes a cup shaped housing 32 rigidly attached to the rear section 34 of the engine by bolts 36 which extend through lugs 37 integral with the housing. Each mount also includes a stem 38 integral with housing 32 and pivotally connected at 40 to a bracket 42 which is rigidly attached to the engine crank case 12 by cap screws 44.

The cup shaped housing 32 has an open top closed by a screw threaded cover 46 having a large axial opening 48 through which the smaller hollow stem 50 of a mushroom-shaped core member 51 freely extends. The annular head 52 of the core member is located in the housing 32, substantially midway between the bottom of the housing and its cover, by resilient rubber pads 54 and 56 bonded to the opposite faces thereof. These pads comprise metal plates 58 and 60 interposed between and bonded to layers of rubber or rubber-like material 59 and 61. Pad 54 is centered in the cup 32 by the outermost plate 58 which is seated in a shallow recess formed in the bottom surface of the cup. The side walls of the pad are spaced from the walls of the cup. Pad 56, which surrounds the stem 50 and whose side walls are also spaced from the walls of the cup, is centered or located by the outermost plate 60 which seats in a pad locating recess formed on the inner face of the cover 46. Stem 50 has a screw threaded axial passage into which is threaded a stud 62 which extends through a sleeve 64 that passes diametrically through and is welded permanently to the mounting ring 28. It will be evident that when the mount unit is assembled, with the stud 62 screwed into the axial passage in the stem 50, the core member 52 is rigidly supported from the ring 28 while the cup 32 and the engine 10 are resiliently supported by the pads 54 and 56.

A friction mechanism is provided for damping lateral movements of cup 32 relative to core 52. It includes an annular belleville spring member 68, the outer periphery of which fits closely within a recess in the cover 46, cooperating friction member 70 carried by and axially slidable on the stem 50.

In accordance with the present invention, a mounting system is provided for the engine 10, utilizing a plurality of mount units 26, by which a selected point within, or on, the power plant can be maintained stationary during maneuvers of the airplane. For the purpose of explaining the invention, the point O at the rear of the engine has been selected as the point to be maintained stationary, this point being, as illustrated, the center of a universal joint between the engine accessory drive shaft and a shaft 22 which may drive, for example, a generator or a remotely disposed auxiliary-stage supercharger (not shown). It is desirable to maintain the position of the power takeoff at point O stationary with respect to fixed airplane structure regardless of how much motion occurs at other points on the engine with respect to the airplane, since the universal joint can withstand angular deflections about O but not lateral deflections.

It has been found that the selected point O can be maintained fixed, without adversely affecting the vibrational characteristics of the engine in its mount to a material extent, if a definite relationship is maintained between the translational stiffness of the mounting system at the elastic center, the rotational stiffness of the mounting system around the elastic center, and the location of the elastic center with respect to the center of gravity within the power plant and with respect to the point O which it is desired to maintain stationary relative to fixed airplane structure.

By properly arranging the major compressive axes of the several mount units 26 and selecting suitable stiffness ratios for the mount units so that the elastic center of the mounting system falls on the engine crankshaft at a point $a$ inches aft of the center of gravity of the engine and $b$ inches forward of the selected point O, displacement of the point O can be kept at zero during a lateral displacement of the elastic center through a distance $x$ inches if $x=\theta b$, where $\theta$ equals the angle in radians through which the engine moves in a counterclockwise direction (Fig. 1) about the point O. The application of power plant weight $w$, in pounds, will produce deflections of $x=w/k_y$ and $\theta=wa/k_\theta$, where $k_y$ is the translational stiffness at the elastic center in pounds/inch and $k_\theta$ is the rotational stiffness around said elastic center in pound inches/radian. Substituting these deflections in the equation $x=\theta b$ we may write $$w/k_y = (wa/k_\theta)b$$

which reduces to the relation $ab=k_\theta/k_y$. Thus, the point O may be maintained stationary, during a deflection of the power plant as a whole, by correlating the position of the elastic center with the translational and rotational stiffnesses of the mount system so that $ab=k_\theta/k_y$.

Other mount requirements, such as obtaining a desired frequency spectrum, must be met in addition to the one specified above. However, the relative values of $k_\theta$ and $k_y$, for example, may be varied through a wide range while maintaining the relationship $ab=k_\theta/k_y$. Thus it is possible, within limits imposed by the requirement that $ab=k_\theta/k_y$, to bring the translational and rotational natural frequencies to a satisfactory frequency range. The sum of the distances $a$ and $b$ will be fixed for a given installation by the geometry of the power plant, but the product $ab$ may be varied by varying "$a$" in relation to "$b$" to obtain satisfactory translational and rotational frequencies without upsetting the relationship of the formula $ab=k_\theta/k_y$.

In practice $$\frac{k_\theta}{k_y}$$

may be selected to satisfy some other mounting or vibrational requirement, not directly concerned with the present invention. As an example it will be assumed that $$\frac{k_\theta}{k_y}=225$$

for an installation such as shown in Fig. 1. Also, it will be assumed that $a+b$, for an installation of the type shown in Fig. 1, equals 50 inches. But, according to the present invention, $$\frac{k_\theta}{k_y}$$

should be equal or substantially equal to $ab$. Therefore, if $$\frac{k_\theta}{k_y}$$

is selected as equal to 225 then $ab$ must equal 225 and if $a+b=50$, then "$a$" can be taken as 5 inches and "$b$" must equal 45 inches (in this instance it is preferable that $a$ have the smaller value).

It can be shown that the following equations apply to mounting systems in which the stiffness of each mount unit is the same in all shear directions:

$$(1) \quad \frac{k_\theta}{k_y} = \frac{C^2\left[\frac{2}{f-1} + \frac{2}{(f-1)^2} - \frac{\sin^2 \alpha}{f-1}\right]}{\left[\sin^2 \alpha + \frac{2}{f-1}\right]^2}$$

$$(2) \quad a = d - \frac{C \sin \alpha \cos \alpha}{\sin^2 \alpha + \frac{2}{f-1}}$$

where $C$ = radial distance of mounting units from crankshaft centerline $f = \dfrac{\text{stiffness of individual mounting unit in compression}}{\text{stiffness of individual mounting unit in shear}}$ $a$ = angle between compression axes of mounting units and crankshaft axis.

$d$ = distance from the C. G. of the power plant to the plane of the mount units (the plane containing the centers of the individual mounting units).

In the example assumed (for an installation like Fig. 1) $C$ and $d$, which are determined by the geometry of the installation, are taken as equal to 17 inches and 27 inches, respectively.

Hence, substituting:

$$(1) \quad 225 = \frac{289\left[\frac{2}{f-1} + \frac{2}{(f-1)^2} - \frac{1}{f-1}\sin^2 \alpha\right]}{\left[\frac{2}{f-1} + \sin^2 \alpha\right]^2}$$

$$(2) \quad 5 = 27 - \frac{17 \sin \alpha \cos \alpha}{\sin^2 \alpha + \frac{2}{f-1}}$$

A solution of these two simultaneous equations, to determine values of "$f$" and "$a$" which satisfy the set, may be found in any convenient manner. They are as follows:

$$f = 22.6 \quad a = 29.2°$$

These values may be readily achieved in practice.

As stated above, the sum of the distances $a$ and $b$ will be fixed for a given installation. This will also fix the sum of the distances $d$ and $s$ at the same value since the two sums are equal. The letter $s$ represents the distance from the plane of the mount units to the point O to be held stationary. From this it can be seen that:

$$a + b = d + s$$
and therefore $b = d - a + s$
solving equation (2) for $d - a$ $$d - a = \frac{C \sin \alpha \cos \alpha}{\sin^2 \alpha + \frac{2}{f-1}}$$

substituting this expression for $d - a$ in $b = d - a + s$ $$b = \frac{C \sin \alpha \cos \alpha}{\sin^2 \alpha + \frac{2}{f-1}} + s$$

Now to obtain the relation of $ab = k_\theta/k_y$ in terms of the distance from the C. G. of the power plant to the plane of the mount units, the radial distance of the mounting units from the axis of the drive shaft, the stiffness of the individual mounting unit in compression divided by the stiffness of the individual mounting unit in shear, the distance from the plane of the mounting units to the point O to be held stationary and the angle between the compression axis of each mounting unit and the axis of the drive shaft, the expression for these terms presented in equations (1) (2) and (3) are substituted therein as follows:

$$\left(d - \frac{C \sin \alpha \cos \alpha}{\sin^2 \alpha + \frac{2}{f-1}}\right)\left(\frac{C \sin \alpha \cos \alpha + s}{\sin^2 \alpha + \frac{2}{f-1}}\right) = \frac{C^2\left(\frac{2}{f-1} + \frac{2}{(f-1)^2} - \frac{\sin^2 \alpha}{f-1}\right)}{\left(\sin^2 \alpha + \frac{2}{f-1}\right)^2}$$

then $$\left[\frac{d\left(\sin^2 \alpha + \frac{2}{f-1}\right) - C \sin \alpha \cos \alpha}{\sin^2 \alpha + \frac{2}{f-1}}\right]$$

$$\left[\frac{C \sin \alpha \cos \alpha + s\left(\sin^2 \alpha + \frac{2}{f-1}\right)}{\sin^2 \alpha + \frac{2}{f-1}}\right] = \frac{C^2\left(\frac{2}{f-1} + \frac{2}{(f-1)^2} - \frac{\sin^2 \alpha}{f-1}\right)}{\left(\sin^2 \alpha + \frac{2}{f-1}\right)^2}$$

and $$\left[d\left(\sin^2 \alpha + \frac{2}{f-1}\right) - C \sin \alpha \cos \alpha\right]$$

$$\left[C \sin \alpha \cos \alpha + s\left(\sin^2 \alpha + \frac{2}{f-1}\right)\right] = C^2\left(\frac{2}{f-1} + \frac{2}{(f-1)^2} - \frac{\sin^2 \alpha}{f-1}\right)$$

It will be evident that as a result of this invention it has been made possible to resiliently mount a power plant by means of a plurality of peripherally arranged suspension units so that a selected point on the engine remains stationary with respect to fixed airplane structure during lateral deflections of the power plant, such as may be caused by maneuver loads applied thereto. While only one embodiment of the invention has been shown and described herein in connection with a power take-off for an engine, it is to be understood that the invention is not limited to the particular form shown but may be used in other ways without departure from its spirit as defined by the following claims.

I claim:

1. In combination with aircraft structure, an aircraft power plant having an axial drive shaft, a power takeoff at one end of said shaft including a driven shaft having a universal connection with said drive shaft, and a plurality of flexible mount units connecting said power plant with said aircraft structure, said units being disposed in a plane perpendicular to the axis of said drive shaft and offset from the center of gravity of said power plant, said units having compressive axes intersecting the axis of said drive shaft at a point, the relation of the angle between the drive shaft axis and the respective compressive axes of the mount units to the ratio between the compression stiffness and shear stiffness of the individual mount units being such as to satisfy the equation:

$$\left[d\left(\sin^2\alpha+\frac{2}{f-1}\right)-C\sin\alpha\cos\alpha\right]$$
$$\left[C\sin\alpha\cos\alpha+s\left(\sin^2\alpha+\frac{2}{f-1}\right)\right]=$$
$$C^2\left(\frac{2}{f-1}+\frac{2}{(f-1)^2}-\frac{\sin^2\alpha}{f-1}\right)$$

where $d$ = distance from the C. G. of the power plant to the plane of the mount units (the plane containing the centers of the individual mounting units),
$s$ = distance from the plane of the mount units to the center of said universal connection,
$C$ = radial distance of mounting units from crankshaft centerline,
$a$ = angle between compression axes of mounting units and crankshaft axis, and $$f=\frac{\text{stiffness of individual mounting unit in compression}}{\text{stiffness of individual mounting unit in shear}}$$

2. In combination with aircraft structure, an aircraft power plant having an axial drive shaft, a power takeoff at one end of said shaft including a driven shaft having a universal connection with said drive shaft, and a plurality of flexible mount units connecting said power plant with said aircraft structure, said units being disposed in a plane perpendicular to the axis of said drive shaft and offset from the center of gravity of said power plant, said units having compressive axes intersecting the axis of said drive shaft at a point offset from said plane, the relation of the angle between the drive shaft axis and the respective compressive axes of the mount units to the ratio between the compression stiffness and shear stiffness of the individual mount units being such as to satisfy the equation:

$$\left[d\left(\sin^2\alpha+\frac{2}{f-1}\right)-C\sin\alpha\cos\alpha\right]$$
$$\left[C\sin\alpha\cos\alpha+s\left(\sin^2\alpha+\frac{2}{f-1}\right)\right]=$$
$$C^2\left(\frac{2}{f-1}+\frac{2}{(f-1)^2}-\frac{\sin^2\alpha}{f-1}\right)$$

where $d$ = distance from the C. G. of the power plant to the plane of the mount units (the plane containing the centers of the individual mounting units),
$s$ = distance from the plane of the mount units to the center of said universal connections,
$c$ = radial distance of mounting units from crankshaft centerline,
$a$ = angle between compression axes of mounting units and crankshaft axis, and $$f=\frac{\text{stiffness of individual mounting unit in compression}}{\text{stiffness of individual mounting unit in shear}}$$

JOHN M. TYLER.

REFERENCES CITED

The following references are of record in the file of this patent:

UNITED STATES PATENTS

| Number | Name | Date |
|---|---|---|
| 2,175,825 | Brown | Oct. 10, 1939 |
| 2,175,999 | Taylor | Oct. 10, 1939 |
| 2,220,514 | D'Aubarede | Nov. 5, 1940 |
| 2,368,334 | Tyler | Jan. 30, 1945 |
| 2,395,143 | Prewitt | Feb. 19, 1946 |
| 2,475,340 | Berry | Dec. 28, 1948 |

FOREIGN PATENTS

| Number | Country | Date |
|---|---|---|
| 500,247 | Great Britain | Feb. 6, 1939 |
| 542,207 | Great Britain | of 1940 |